(12) United States Patent
Adedeji et al.

(10) Patent No.: US 6,350,804 B2
(45) Date of Patent: *Feb. 26, 2002

(54) COMPOSITIONS WITH ENHANCED DUCTILITY

(75) Inventors: Adeyinka Adedeji, Albany; John R. Campbell; Farid Fouad Khouri, both of Clifton Park; Patrick A. Rodgers, Selkirk, all of NY (US)

(73) Assignee: General Electric Co., Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,462

(22) Filed: Apr. 14, 1999

(51) Int. Cl.[7] .................................................. C08K 3/34
(52) U.S. Cl. ........................ 524/445; 524/122; 524/127; 525/391
(58) Field of Search ................................. 524/188, 445, 524/451; 502/63; 501/148, 129; 525/391

(56) References Cited

U.S. PATENT DOCUMENTS

| | | | |
|---|---|---|---|
| 4,077,938 A | | 3/1978 | Daimon et al. |
| 4,216,135 A | * | 8/1980 | Finlayson ................. 260/40 R |
| 4,558,075 A | | 12/1985 | Suss et al. |
| 4,582,866 A | | 4/1986 | Shain |
| 4,739,007 A | | 4/1988 | Okada et al. |
| 4,810,734 A | | 3/1989 | Kawasumi et al. |
| 4,828,723 A | * | 5/1989 | Cao et al. ..................... 252/8.8 |
| 4,889,885 A | | 12/1989 | Usuki et al. |
| 5,102,948 A | | 4/1992 | Deguchi et al. |
| 5,118,787 A | * | 6/1992 | Furuno ....................... 528/482 |
| 5,164,460 A | | 11/1992 | Yano et al. |
| 5,248,720 A | | 9/1993 | Deguchi et al. |
| 5,385,776 A | | 1/1995 | Maxfield et al. |
| 5,530,052 A | | 6/1996 | Takekoshi et al. |
| 5,552,469 A | | 9/1996 | Beall et al. |
| 5,554,674 A | | 9/1996 | Hamilton |
| 5,707,439 A | | 1/1998 | Takekoshi et al. |
| 5,770,644 A | * | 6/1998 | Yamamoto et al. ......... 524/120 |
| 5,932,634 A | * | 8/1999 | Hosokawa et al. ......... 523/209 |
| 5,952,417 A | * | 9/1999 | Chao et al. .................. 524/451 |
| 6,036,765 A | * | 3/2000 | Farrow et al. ............... 106/487 |

FOREIGN PATENT DOCUMENTS

| | | | |
|---|---|---|---|
| EP | 0054845 | * | 6/1982 |
| WO | 00028 | * | 1/1980 |
| WO | 43747 | * | 9/1999 |

* cited by examiner

*Primary Examiner*—Edward J. Cain
*Assistant Examiner*—Katarzyna Wyrozebski-Lee

(57) ABSTRACT

The invention relates to compositions comprising an organoclay and polyphenylene ether resin and blends containing polyphenylene ether resin. In a preferred embodiment, the compositions exhibit physical properties that are enhanced over compositions containing clay of the prior art. The invention also relates to methods to enhance the ductility of thermoplastic compositions as compared to compositions containing clay of the prior art. The invention also relates to articles made from the compositions.

31 Claims, No Drawings

COMPOSITIONS WITH ENHANCED DUCTILITY

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to compositions comprising an organically modified layered silicate clay generally referred to as organoclay and polyphenylene ether resin and blends containing polyphenylene ether resin.

In a preferred embodiment, the compositions exhibit physical properties that are enhanced over compositions containing clay of the prior art. The invention also relates to methods to enhance the ductility of thermoplastic compositions as compared to compositions containing clay of the prior art. The invention also relates to articles made from the compositions.

2. Brief Description of the Related Art

Many commercial articles, such as connectors and automotive under hood components, require levels of stiffness and heat resistance that are greater than most thermoplastic resins. Inorganic fillers have been used to increase the stiffness and heat resistance of thermoplastic resins, however, concomitant with an unacceptable loss in ductility for many applications.

Organoclay materials have been used in crystalline resins, e.g., polyesters and polyamide resins, to enhance the flame and/or temperature resistance characteristics. The utility of organoclay material to enhance the ductility of thermoplastic resins is believed to be novel and non-obvious.

SUMMARY OF THE INVENTION

The present invention relates to compositions comprising:
(i) polyphenylene ether resin and blends containing polyphenylene ether resin, and
(ii) an organoclay.

The invention also relates to methods to enhance the ductility of thermoplastic compositions as compared to compositions containing clay of the prior art. The invention also relates to articles made from the compositions and methods.

The description which follows provides further details regarding this invention.

DESCRIPTION OF THE DRAWINGS

Not applicable.

DETAILED DESCRIPTION OF THE INVENTION

As used herein, organoclay is a layered silicate clay, derived from layered minerals, in which organic structures have been chemically incorporated. Illustrative examples of organic structures are trimethyldodecylammonium ion and N,N'-didodecylimidazolium ion. Since the surfaces of clay layers, which have a lattice-like arrangement, are electrically charged, they are capable of binding organic ions. There is no limitation with respect to the layered minerals employed in this invention other than that they are capable of undergoing an ion exchange with the organic ions. The preferred organoclays are layered minerals that have undergone cation exchange with organo cations and/or onium compounds. Illustrative of such layered minerals are the kaolinite group and the montmorillonite group. It is also within the scope of this invention to employ minerals of the illite group which can include hydromicas, phengite, brammallite, glaucomite, celadonite and the like. Often, however, the preferred layered minerals include those often referred to as 2:1 layered silicate minerals like muscovite, vermiculite, saponite, hectorite and montmorillonite, wherein montmorillonite is often preferred. The layered minerals described above may be synthetically produced. However, most often they are naturally occurring and commercially available. A detailed description of the layered minerals can be found in U.S. Pat. No. 5,530,052 which is incorporated herein by reference.

The amount of organoclay present in the compositions of the invention can vary depending on the final properties desired. Generally, the level is adjusted to allow for the desired level of increased stiffness, heat resistance, and/or dimensional stability balanced against the level of achievable ductility. Typical levels include from about 1% to about 25% by weight, preferably between about 1% to about 15% by weight, based upon the entire weight of the composition.

Descriptions of useful resins for the practice of the present invention are provided as follows.

Polyphenylene Ether Resin and Blends Containing Polyphenylene Ether Resin.

Polyphenylene ether resin, hereinafter "PPE", per se, are known polymers comprising a plurality of structural units of the formula (I):

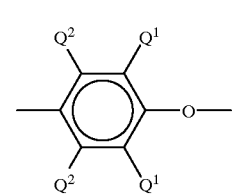

(I)

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer.

It will be apparent to those skilled in the art from the foregoing that the PPE contemplated for use in the present invention include all those presently known, irrespective of variations in structural units or ancillary chemical features.

The PPE generally have an intrinsic viscosity often between about 0.05–0.60 dl./g., preferably in the range of about 0.10–0.48 dl./g., all as measured in chloroform at 25° C. It is also possible to utilize a high intrinsic viscosity PPE and a low intrinsic viscosity PPE in combination. By high viscosity is meant a PPE having an I.V. of at least about 0.30 dl/g, and conversely, by low is meant a PPE with an I.V. of less than about 0.30 dl/g, preferably less than about 0.20 dl/g. Determining an exact ratio, when two intrinsic viscosities are used, will depend somewhat on the exact intrinsic viscosities of the PPE used and the ultimate physical properties that are desired.

The PPE resin compositions of the present invention preferably contain at least one nonelastomeric polymer of an alkenylaromatic compound. Suitable polymers of this type may be prepared by methods known in the art including bulk, suspension and emulsion polymerization. They generally contain at least about 25% by weight of structural units derived from an alkenylaromatic monomer of the formula (II)

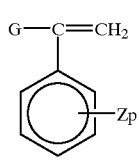

(II)

wherein G is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The amount of the polymer of a nonelastomeric alkenylaromatic compound, when one is used, is an amount effective to improve the flow and processability of the composition. Improved flow can be indicated by reduced viscosity or reduced injection pressures needed to fill a part during an injection molding process. Generally, the nonelastomeric alkenylaromatic compound is utilized in the range of about 20% to about 60% by weight based on the total weight of the composition. The preferred range is about 30% to about 60% by weight; based on the total weight of the composition.

The compositions of the present invention may also contain at least one impact modifier. The impact modifier may be used alone or in combination with a nonelastomeric alkenylaromatic compound. The impact modifiers include block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are available commercially from a number of sources, including Phillips Petroleum under the trademark SOLPRENE, Shell Chemical Co. under the trademark KRATON, and Kuraray under the trademark SEPTON.

Various mixtures of the aforementioned impact modifiers are also sometimes useful. The amount of the impact modifier generally present, when one is used, is an amount effective to improve the physical properties, for example, the ductility of the composition when compared to the same composition without an impact modifier. Improved ductility can be indicated by increased impact strength, increased tensile elongation to break, or both increased impact strength and increased tensile elongation to break. Generally, the impact modifier is utilized in the range of about 1% to about 20% by weight based on the total weight of the composition. A preferred range is about 1% to about 8% by weight; based on the total weight of the composition. The exact amount and types or combinations of impact modifiers utilized will depend in part on the requirements needed in the final blend composition.

For compositions comprising polyphenylene ether resin, preferred compositions have the major components which make up the composition in an amount within the following preferred ranges:

Polyphenylene ether resin, (a) about 30 to about 70 parts;
Non-elastomeric polymer of an alkenylaromatic compound, (b) about 20 to about 60 parts; and
Organoclay, (c) about 1 to about 10 parts;
based on 100 parts by weight of (a), (b), and (c) together.

Compatibilized blends of polyphenylene ether resin and polyamide resin are another useful resin composition for the present invention. Compatibilized blends of a polyphenylene ether resin and a polyamide resin are generally known in the art. These blends are typically made through reactive compounding techniques involving addition of a compatibilizing agent to compositions containing polyphenylene ether resin and polyamide resin. The compatibilizing agent is thought to result in reaction products between the polyphenylene ether resin and a polyamide resin and that these reaction products improve the compatibility between the polyphenylene ether resin and polyamide resin. The improved compatibility results in enhanced physical properties such as, for example, increased ductility. Illustrative compatibilizing agents for blends of polyphenylene ether resin and polyamide resin include citric acid, maleic anhydride, fumaric acid, malic acid as well as various derivatives of the foregoing.

The ratio of polyphenylene ether resin to polyamide resin can vary widely but is preferably adjusted so that the polyamide resin remains the continuous phase. Preferably the polyamide is at least about 40% by weight of the total resin composition. Increasing the level of the polyamide results in enhanced ductility and flow and is often preferred. The resin compositions may contain more than one type of polyamide resin such as a blend of nylon 6 and nylon 6,6. Moreover, the amine to acid endgroup ratio of the polyamide resin may also be varied as well as the relative viscosity of the polyamide contained within the resin composition.

The polyphenylene ether resins useful in the present invention include all known polyphenylene ether resins. Preferable resins include poly(2,6-dimethylphenylene ether) as well as the copolymer resins of 2,6-dimethylphenol and 2,3,6-trimethylphenol. These and other variations of the polyamide and the polyphenylene ether resins do not detract from the present invention.

The compatibilized blend of polyphenylene ether resin and polyamide resin may additionally contain various property modifiers such as elastomers for ductility enhancement. Useful elastomers for this purpose are known in the art and include, for example, styrenic block copolymers and various acid functionalized ethylene-propylene copolymers (e.g., EP-graft-maleic anhydride). Especially preferred are the so called elastomeric block copolymers, for example, A-B-A triblock copolymers and A-B diblock copolymers. The A-B and A-B-A type block copolymer rubber additives which may be used are thermoplastic rubbers comprised of one or two alkenyl aromatic blocks which are typically styrene blocks and a rubber block, e.g., a butadiene block which may be partially or totally hydrogenated. Mixtures of these triblock copolymers and diblock copolymers are especially preferred in the present compositions.

Suitable A-B and A-B-A type block copolymers are disclosed in, for example, U.S. Pat. Nos. 3,078,254, 3,402,159, 3,297,793, 3,265,765, and 3,594,452 and U.K. Patent 1,264,741. Examples of typical species of A-B and A-B-A block copolymers include polystyrene-polybutadiene (SBR), polystyrene-poly(ethylene-propylene), polystyrene-polyisoprene, poly($\alpha$-methylstyrene)-polybutadiene, polystyrene-polybutadiene-polystyrene (SBR), polystyrene-poly(ethylene-butylene)-polystyrene, polystyrene-polyisoprene-polystyrene and poly($\alpha$-methylstyrene)-polybutadiene-poly($\alpha$-methylstyrene), as well as the selectively hydrogenated versions thereof. Mixtures of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the tradename VECTOR, and Kuraray under the trademark SEPTON. Other property modifiers include nucleating agents, stabilizers, pigments, dyes, and mineral fillers and reinforcing agents.

Also useful elastomers include functionalized elastomeric polyolefins such as elastomeric polyolefins containing at least one moiety of the group consisting of anhydride, epoxy, oxazoline, and orthoester. The essential structural units of the elastomeric polyolefin are derived from ethylene and at least one $C_{3-8}$ 1-olefin, such as, propylene, 1-butene, 1-hexene, and 1-octene. The proportions of ethylene and at least one $C_{3-8}$ 1-olefin are not critical provided that they together constitute the major portion of the polymer.

In a preferred embodiment, the functionalized elastomeric polyolefin is a functionalized ethylene-propylene rubber or a functionalized ethylene-propylene-diene elastomer. The diene portion is at least one non-conjugated diene, such as ethylidene norbornene, 1,4-hexadiene, or dicyclopentadiene. These elastomeric polyolefins are known in the art as EPR and EPDM elastomers.

A useful amount of the optional elastomeric block copolymers is between about 1% and about 15% by weight, preferably between about 1% and about 10% by weight, wherein the weight percentages are based on the entire weight of the composition. Mixtures of the previous described impact modifiers are also useful.

Flame Retardant

The resins of the present invention may also comprise at least one flame retardant, generally a halogenated material, an organic phosphate, or a combination of the two. For resin compositions containing polyphenylene ether or polycarbonate resin, the organic phosphate class of materials are generally preferred. The organic phosphate is preferably an aromatic phosphate compound of the formula (III):

(III)

where R is the same or different and is alkyl, cycloalkyl, aryl, alkyl substituted aryl, halogen substituted aryl, aryl substituted alkyl, halogen, or a combination of any of the foregoing, provided at least one R is aryl.

Examples include phenyl bisdodecyl phosphate, phenyl-bisneopentyl phosphate, phenyl-bis (3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis (2,5,5'-trimethylhexyl) phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula (IV), (V), or (VI) below:

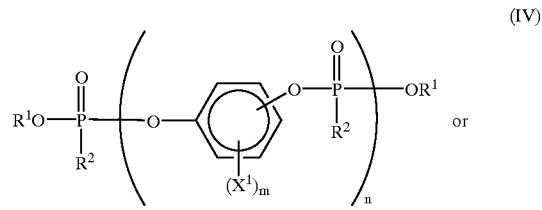

(IV)

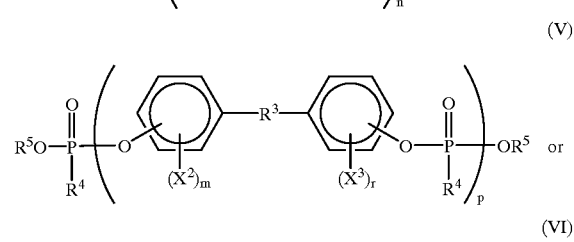

(V)

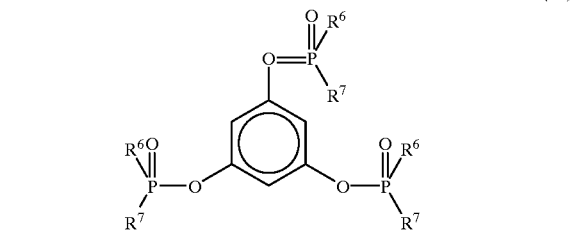

(VI)

including mixtures thereof, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another group of useful flame retardants include certain cyclic phosphates, for example, diphenyl pentaerythritol diphosphate, as a flame retardant agent for polyphenylene ether resins, as is described by Axelrod in U.S. Pat. No. 4,254,775.

Also suitable as flame-retardant additives for this invention are the phosphoramides of the formula (VII):

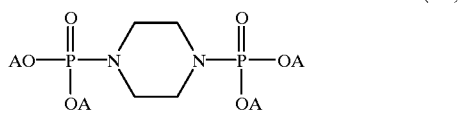

(VII)

wherein each A moiety is a 2,6-dimethylphenyl moiety or a 2,4,6-trimethylphenyl moiety. These phosphoramides are piperazine-type phosphoramides. These additives are known in the art and have been described in Talley, *J. Chem. Eng. Data*, 33, 221–222 (1988). When polyamide resins are used as part of the composition, these piperazine-type phosphoramides are especially useful as they are believed to have less interactions with the polyamides then the organo-ester type phosphates.

Preferred phosphate flame retardants include those based upon resorcinol such as, for example, resorcinol tetraphenyl diphosphate, as well as those based upon bis-phenols such as, for example, bis-phenol A tetraphenyl diphosphate. Also preferred are the aforementioned piperazine-type phosphoramides. Phosphates containing substituted phenyl groups are also preferred. In an especially preferred embodiment, the organophosphate is selected from the group consisting of butylated triphenyl phosphate ester, resorcinol tetraphenyl diphosphate, bis-phenol A tetraphenyl diphosphate, and mixtures containing at least one of the foregoing.

The flame retardant is present in at least the minimum amount necessary to impart a degree of flame retardancy to the composition to pass the desired UL-94 protocol. The particular amount will vary, depending on the molecular weight of the organic phosphate, the amount of the flammable resin present and possibly other normally flammable ingredients which might also be included in the composition.

Halogenated materials are also a useful class of flame retardants. These materials are preferably aromatic halogen compounds and resins of the formula (VIII):

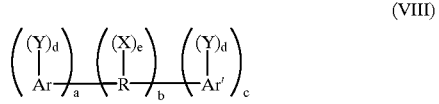

(VIII)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of either oxygen ether; carbonyl; amine; a sulfur containing linkage, e.g., sulfide, sulfoxide, sulfone; a phosphorus containing linkage; etc. R can also consist of two or more alkylene or alkylidene linkages connected by such groups as aromatic, amino, ether, carbonyl, sulfide, sulfoxide, sulfone, a phosphorus containing linkage, etc. Other groups which are represented by R will occur to those skilled in the art, including those found in U.S. Pat. Nos. 4,692,490 and 4,191,685.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, iodine, fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl nucleus.

X is a monovalent hydrocarbon group exemplified by the following: alkyl, such as methyl, ethyl, propyl, isopropyl, butyl, decyl, etc; aryl groups, such as phenyl, naphthyl, biphenyl, xylyl, tolyl, etc; aralkyl groups such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dichromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane 2,2 bis-(3-bromo-4-hydroxyphenyl)-propane.

The preparation of these and other applicable bisphenols is known in the art. They are most commonly prepared by condensation of two moles of a phenol with a single mole of a ketone or aldehyde. In place of the divalent aliphatic group in the above examples may be substituted oxygen, sulfur, sulfoxy, etc.

Included within the above structural formula are: 1,3-dichlorobenzene, 1,4-dibrombenzene, 1,3-dichloro-4-hydroxybenzene and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as, for example, a copolycarbonate of bisphenol A and tetrabromobisphenol A and a carbonate precursor, e.g., phosgene. Metal synergists, e.g., antimony oxide, may also be used with the flame retardant.

The composition can be further modified, if desired, by including one or more additives often used with thermoplastic polymers, some of which may serve to beneficially affect the chemical and physical properties. Examples are mineral fillers, including clay, reinforcing agents, for example, glass fibers, flakes or spheres, plasticizers, flame retardants, stabilizers, antioxidants, colorants, processing aids, and so forth.

The resin compositions used in the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into small pellets for packaging and further handling.

All of the ingredients may be added initially to the processing system, or else certain additives may be pre-compounded with each other. For example, it is often preferred to predisperse the organo-clay into a resin at a higher loading than in the desired final product to make a concentrate. The concentrate is then added in an amount necessary to achieve the desired final amount. Concentrates are especially useful and desirable when a crystalline resin, e.g. polyamide, polyester, or polyolefin, is used as at least part of the resin composition. In one embodiment, it is also desirable to disperse the organoclay in a low I.V. PPE, preferably having an I.V. of less than about 0.20 dl/g as measured in chloroform at 23° C. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should be clear that articles formed out of the thermoplastic compositions described herein are another embodiment of the present invention.

All patents cited are incorporated herein by reference.

The invention will be further illustrated by the following examples.

EXPERIMENTAL

In the examples the following materials have been used:
PPE 0.46 I.V. poly(2,6-dimethylphenylene ether) resin
HIPS high impact polystyrene
SBS polystyrene-polybutadiene-polystyrene block copolymer, commercially available from Shell Chemical Co. as KRATON® D-1102
FR mixture of tris(alkylphenyl) phosphate including triphenyl phosphate
Organoclay Claytone HY (dimethyl hydrogenated ditallow ammonium chloride exchanged sodium montmorillonite) commercilly available from Southern Clay Products
HG-90 a silicate clay, commercially available from Huber Co. as grade HG-90
TSAN polytetrafluoro ethylene (PTFE) dispersion in styrene-acrylonitrile copolymer having over 50% PTFE content
PE linear low density polyethylene
I-1010 a commercially available hindered phenol antioxidant, commercially available from Ciba-Geigy as Irganox 1010
ZnO zinc oxide
ZnS zinc sulfide The compositions of the table were extruded on a Werner-Pfleiderer twin-screw extruder at a temperature of about 280–300° C. with a vacuum of 2 inches Hg applied to the melt during compounding. The resultant compositions were molded using a Toshiba injection molding machine using a temperature set of about 280–300° C. and a mold temperature of about 100° C. Test specimens were subjected to testing under ASTM conditions.

TABLE 1

| Sample | 1 | 2 | 3 | 4 | 5 | 6 | 7 | 8 |
|---|---|---|---|---|---|---|---|---|
| PPE | 42 | 48 | 55 | 42 | 48 | 55 | 44 | 44 |
| HIPS | 58 | 52 | 45 | 58 | 52 | 45 | 56 | 56 |
| SBS | 2 | 2 | 2 | 2 | 2 | 2 | 2 | 4 |
| FR | 2 | 4 | 6 | 2 | 4 | 6 | 6 | 2 |
| Organoclay | 1 | 1 | 1 | 0 | 0 | 0 | 4 | 4 |
| HG-90 | 0 | 0 | 0 | 1 | 1 | 1 | 0 | 0 |
| TSAN | 0.1 | 0.1 | 0.1 | 0.1 | 0.1 | 0.1 | 0 | 0 |
| PE | 1.5 | 1.5 | 1.5 | 1.5 | 1.5 | 1.5 | 1.5 | 1.5 |
| I-1010 | 0.5 | 0.5 | 0.5 | 0.5 | 0.5 | 0.5 | 0.5 | 0.5 |
| ZnO | 0.16 | 0.16 | 0.16 | 0.16 | 0.16 | 0.16 | 0.16 | 0.16 |
| ZnS | 0.2 | 0.2 | 0.2 | 0.2 | 0.2 | 0.2 | 0.16 | 0.16 |
| Properties | | | | | | | | |
| n. Izod (ft-lb/in) | 6.5 | 7 | 7.1 | 5.7 | 5.6 | 5.4 | 3.1 | 5.49 |
| Flex. Mod. (kpsi) | 336.8 | 349.4 | 361.1 | 333.5 | 345 | 352.5 | 374.9 | 369.3 |
| Dyn. 23° C. (ft-lb) | 23 | 28 | 36 | 21 | 22 | 14 | 23 | 37 |
| Dyn. −30° C. (ft-lb) | 38 | 41 | 42 | 37 | 39 | 39 | 8 | 14 |
| HDT @ 66 psi (° F.) | 238 | 235 | 236 | 237 | 238 | 238 | 223 | 235.6 |

As can be seen by the above data, increased notched Izod impact strength can be achieved with the use of the organoclay over unmodified clay reinforcement. Stiffness as indicated by flexural modulus and heat resistance as indicated by heat distortion temperature (HDT) are not diminished with the use of the organoclay. Based upon the teachings of the prior art, it was unexpected that this combination of properties could be achieved.

The preceding examples are set forth to illustrate specific embodiments of the invention and are not intended to limit its scope. It should be clear that the present invention includes articles from the compositions as described herein. Additional embodiments and advantages within the scope of the claimed invention will be apparent to one of ordinary skill in the art.

What is claimed is:

1. A composition comprising:
   about 30 to about 70 parts by weight of a polyphenylene ether resin;
   about 20 to about 60 parts by weight of an alkenylaromatic compound, wherein the alkenylaromatic compound is a high impact polystyrene; and
   about 1 to about 10 parts by weight of an organoclay;
   wherein the parts by weight of the polyphenylene ether, the alkenylaromatic compound, and the organoclay sum to 100.

2. The composition of claim 1 wherein the polyphenylene ether resin is derived from at least 2,6-dimethylphenol.

3. The composition of claim 1 wherein at least part of the polyphenylene ether resin has an intrinsic viscosity between about 0.05 dl/g and about 0.60 dl/g as measured in chloroform at 25° C.

4. The composition of claim 1 wherein the organoclay has been pre-dispersed in at least one resin.

5. The composition of claim 1 wherein the organoclay has been pre-dispersed in a polyphenylene ether resin.

6. The composition of claim 1 wherein the organoclay has been pre-dispersed in a polyphenylene ether resin that has an intrinsic viscosity less than about 0.20 dl/g as measured in chloroform at 25° C.

7. The composition of claim 1, further comprising a polyamide resin.

8. The composition of claim 1 wherein the organoclay has been pre-dispersed in a polyamide resin.

9. The composition of claim 1 wherein the organoclay has been pre-dispersed in a polyolefin resin.

10. The composition of claim 1 wherein the organoclay is a layered mineral having undergone a cation exchange with at least one member selected from the group consisting of:
   (i) a heteroaromatic cation comprising at least one positively charged organo-substituted heteroatom; and
   (ii) a cation comprising at least one positively charged heteroatom not part of an aromatic ring with at least one bond having a bond order greater than one.

11. The composition of claim 10 wherein the layered mineral is from a kaolinite group, montmorillonite group, or illite group.

12. The composition of claim 11 wherein the kaolinite group comprises kaolinite, halloysite, dickite, or nacrite; and wherein the montmorillonite group comprises montmorillonite, nontronite, beidellite, hectorite, or saponite; and wherein the illite group comprises hydromicas, phengite, brammallite, glaucomite, or celadonite.

13. The composition of claim 10 wherein the cation in (i) and the cation in (ii) comprise a heteroatom selected from the group consisting of N, P, O and S.

14. The composition of claim 13 wherein the heteroaromatic cation comprising at least one positively charged organo-substituted heteroatom is an organo-substituted salt of pyrrole, imidazole, thiazole, oxazole, pyridine, pyrimidine, quinoline, isoquinoline, indole, purine, benzimidazole, benzothiazole, benzoxazole, pyrazine, quinoxaline, quinazoline, acridine, phenazine, imidazopyridine, or dipyridyl.

15. The composition of claim 14 wherein the organo-substituted heteroatom is substituted with a $C_{1-25}$ aliphatic, alicyclic, or aromatic group.

16. The composition of claim 15 wherein the heteroaromatic cations are N-$C_{1-18}$ pyridinium cations.

17. The composition of claim 1 wherein the organoclay comprises a dimethyl hydrogenated ditallow ammonium salt exchanged sodium montmorillonite.

18. An article made from the composition of claim 1.

19. The composition of claim 7, further comprising a compatibilizing agent.

20. The composition of claim 1, wherein the composition has a notched Izod impact strength of about 6.5 ft-lb/in or greater.

21. The composition of claim 1, wherein the composition has a notched Izod impact strength of about 7.0 ft-lb/in or greater.

22. The composition of claim 1, further comprising a flame retardant.

23. The composition of claim 22, wherein the flame retardant is an organic phosphate.

24. The composition of claim 23, wherein the organic phosphate is an aromatic phosphate compound of the formula (III):

where R is the same or different and is alkyl, cycloalkyl, aryl, alkyl substituted aryl, halogen substituted aryl, aryl substituted alkyl, halogen, or a combination of any of the foregoing, provided at least one R is aryl.

25. The composition of claim 24, wherein the organic phosphate is selected from the group consisting of phenyl bisdodecyl phosphate, phenylbisneopentyl phosphate, phenyl-bis (3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di (dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl) phosphate, and 2-ethylhexyldiphenyl phosphate.

26. The composition of claim 24, wherein the organic phosphate is unsubstituted or substituted triphenyl phosphate.

27. The composition of claim 24, wherein the organic phosphate is tris(alkylphenyl) phosphate.

28. A composition comprising:
   42 to 55 parts by weight of a polyphenylene ether resin;
   45 to 58 parts by weight of a high impact polystyrene; and
   1 to 4 parts by weight of an organoclay;
   wherein the parts by weight of the polyphenylene ether resin and the high impact polystyrene sum to 100.

29. The composition of claim 28, further comprising 2 to 6 parts by weight of an unsubstituted or substituted triphenyl phosphate.

30. The composition of claim 28, wherein the composition has a notched Izod impact strength of about 6.5 ft-lb/in or greater.

31. The composition of claim 28, wherein the composition has a notched Izod impact strength of about 7.0 ft-lb/in or greater.

* * * * *